US011330152B2

(12) United States Patent
Sung

(10) Patent No.: US 11,330,152 B2
(45) Date of Patent: May 10, 2022

(54) IMAGE DISPLAY SYSTEM AND IMAGE DATA TRANSMISSION APPARATUS AND METHOD THEREOF HAVING SYNCHRONOUS DATA TRANSMISSION MECHANISM

(71) Applicant: REALTEK SEMICONDUCTOR CORPORATION, Hsinchu (TW)

(72) Inventor: Lien-Hsiang Sung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 191 days.

(21) Appl. No.: 16/921,988

(22) Filed: Jul. 7, 2020

(65) Prior Publication Data
US 2021/0289107 A1 Sep. 16, 2021

(30) Foreign Application Priority Data
Mar. 16, 2020 (TW) .................................. 109108615

(51) Int. Cl.
*H04N 5/067* (2006.01)
*H04L 7/06* (2006.01)
*H04L 7/00* (2006.01)

(52) U.S. Cl.
CPC ........... *H04N 5/067* (2013.01); *H04L 7/0091* (2013.01); *H04L 7/06* (2013.01)

(58) Field of Classification Search
CPC .......... H04N 5/067; G09G 5/008; G09G 5/12; G09G 5/18; G09G 5/006; G09G 2310/08
See application file for complete search history.

(56) References Cited

U.S. PATENT DOCUMENTS 7,266,629 B2 * 9/2007 Honda ................. G09G 3/2096
370/464
8,314,885 B2 11/2012 Weng et al.
(Continued)

FOREIGN PATENT DOCUMENTS

TW 200849972 A 12/2008
TW 201519208 A 5/2015

OTHER PUBLICATIONS

OA letter of the counterpart TW application (appl. no. 109108615) dated Dec. 23, 2020. Summary of the OA letter 1. Claims 1 ~10 are rejected as being unpatentable over the disclosure of the cited reference 1 (TW 200849972 A) and the cited reference 2 (TW 201519208 A).

*Primary Examiner* — Brian P Yenke
(74) *Attorney, Agent, or Firm* — WPAT, PC

(57) ABSTRACT

The present invention discloses an image data transmission apparatus. The lock confirmation circuit receives an original signal having an original pulse width from the image data reception apparatus to generate an output signal. The image data transmission circuit determines that the image data reception apparatus locks a transmission frequency when an output pulse width is larger than a pulse threshold value to perform a synchronous image data transmission. The lock confirmation circuit sets the output pulse width to be a lengthened pulse width when a difference between the original pulse width and the pulse threshold value is smaller than a predetermined value and the original pulse width is not smaller than the pulse threshold value. The lock confirmation circuit sets the output pulse width to be a shortened pulse width when the difference is smaller than the predetermined value and the original pulse width is smaller than the pulse threshold value.

18 Claims, 3 Drawing Sheets

(56) References Cited

U.S. PATENT DOCUMENTS

| | | | |
|---|---|---|---|
| 9,236,031 B2* | 1/2016 | Cho | G09G 5/12 |
| 9,245,474 B2 | 1/2016 | Tsai et al. | |
| 2002/0168041 A1* | 11/2002 | Suzuki | H04N 5/126 |
| | | | 348/E5.017 |
| 2005/0174435 A1* | 8/2005 | Nakajima | H04N 5/23203 |
| | | | 348/E5.015 |
| 2013/0057763 A1* | 3/2013 | Cha | G09G 5/12 |
| | | | 348/554 |
| 2015/0049848 A1* | 2/2015 | Morita | H04L 7/0337 |
| | | | 375/354 |
| 2015/0113194 A1* | 4/2015 | Wei | G06F 13/4027 |
| | | | 710/306 |
| 2015/0381341 A1* | 12/2015 | Chen | H04L 7/0004 |
| | | | 375/373 |
| 2016/0372027 A1* | 12/2016 | Hanchate | G06F 3/1431 |
| 2016/0379559 A1* | 12/2016 | Yamaji | G09G 3/2096 |
| | | | 345/213 |
| 2019/0197941 A1* | 6/2019 | Lim | G09G 3/20 |
| 2021/0328757 A1* | 10/2021 | Kim | H04L 7/0087 |
| 2021/0366356 A1* | 11/2021 | Sung | G09G 3/2092 |
| 2021/0367605 A1* | 11/2021 | Lin | G09G 5/008 |

* cited by examiner

IMAGE DISPLAY SYSTEM AND IMAGE DATA TRANSMISSION APPARATUS AND METHOD THEREOF HAVING SYNCHRONOUS DATA TRANSMISSION MECHANISM

BACKGROUND OF THE INVENTION

1. Field of the Invention

The present invention relates to an image display system and an image data transmission apparatus and method thereof having synchronous data transmission mechanism.

2. Description of Related Art

Some consumer electronics products, e.g. smart TVs and smart phones, become popular since these products provide various types of entertainments. As a result, the performance requirement of these products becomes higher and higher. Take the liquid crystal display (LCD) television as an example, a panel having a larger dimension usually offers better viewing experiences. Therefore, televisions are gradually developed to have larger and larger screen sizes, e.g. from 50 inches to 70 inches.

In a large screen size television, a multiple of image data transmission chips are required to provide image data to be displayed by different areas of the panel. However, such a design requires the panel to lock the frequency of the image data transmission chips so as to perform image data transmission and display the image simultaneously. As a result, an accurate synchronous data transmission mechanism is necessary for the multiple of image data transmission chips and the panel, to allow the panel to receive and display the correct image data from the image data transmission chips.

SUMMARY OF THE INVENTION

In consideration of the problem of the prior art, an object of the present invention is to provide an image display system and an image data transmission apparatus and method thereof having synchronous data transmission mechanism.

The present invention discloses an image data transmission apparatus having synchronous data transmission mechanism that includes a plurality of image data transmission circuits and a lock confirmation circuit. Each of the image data transmission circuits is configured to transmit a training pattern signal to an image data reception apparatus. The lock confirmation circuit is configured to receive an original signal having an original pulse width from the image data reception apparatus, to generate an output signal, such that each of the image data transmission circuits is further configured to determine that the image data reception apparatus already locks a transmission frequency according to the training pattern signal when an output pulse width of the output signal is larger than a pulse width threshold value, and to perform a synchronous image data transmission with the image data reception apparatus according to a timing of the training pattern signal. When a difference between the original pulse width and the pulse width threshold value is smaller than a predetermined value, and the original pulse width is not smaller than the pulse width threshold value, the lock confirmation circuit sets the output pulse width of the output signal to be a lengthened pulse width, wherein the difference between the lengthened pulse width and the pulse width threshold value is not smaller than the predetermined value and the lengthened pulse width is larger than the original pulse width. When the difference between the original pulse width and the pulse width threshold value is smaller than the predetermined value, and the original pulse width is smaller than the pulse width threshold value, the lock confirmation circuit sets the output pulse width of the output signal to be a shortened pulse width, wherein the difference between the shortened pulse width and the pulse width threshold value is not smaller than the predetermined value and the shortened pulse width is smaller than the original pulse width.

The present invention also discloses an image display system that includes an image data reception apparatus and an image data transmission apparatus. The image data transmission apparatus includes a plurality of image data transmission circuits and a lock confirmation circuit. Each of the image data transmission circuits is configured to transmit a training pattern signal to the image data reception apparatus. The lock confirmation circuit is configured to receive an original signal having an original pulse width from the image data reception apparatus, to generate an output signal, such that each of the image data transmission circuits is further configured to determine that the image data reception apparatus already locks a transmission frequency according to the training pattern signal when an output pulse width of the output signal is larger than a pulse width threshold value, and to perform a synchronous image data transmission with the image data reception apparatus according to a timing of the training pattern signal. When a difference between the original pulse width and the pulse width threshold value is smaller than a predetermined value, and the original pulse width is not smaller than the pulse width threshold value, the lock confirmation circuit sets the output pulse width of the output signal to be a lengthened pulse width, wherein the difference between the lengthened pulse width and the pulse width threshold value is not smaller than the predetermined value and the lengthened pulse width is larger than the original pulse width. When the difference between the original pulse width and the pulse width threshold value is smaller than the predetermined value, and the original pulse width is smaller than the pulse width threshold value, the lock confirmation circuit sets the output pulse width of the output signal to be a shortened pulse width, wherein the difference between the shortened pulse width and the pulse width threshold value is not smaller than the predetermined value and the shortened pulse width is smaller than the original pulse width.

The present invention further discloses an image data transmission method having synchronous data transmission mechanism used in an image data transmission apparatus that includes steps outlined below. A training pattern signal is transmitted to an image data reception apparatus by each of a plurality of image data transmission circuits; receiving an original signal having an original pulse width from the image data reception apparatus by a lock confirmation circuit. Whether a difference between the original pulse width and a pulse width threshold value is smaller than a predetermined value is determined by the lock confirmation circuit, to generate an output signal having an output pulse width accordingly. When the difference between the original pulse width and the pulse width threshold value is smaller than a predetermined value, and the original pulse width is not smaller than the pulse width threshold value, the output pulse width of the output signal is set to be a lengthened pulse width by the lock confirmation circuit, wherein the difference between the lengthened pulse width and the pulse width threshold value is not smaller than the predetermined value and the lengthened pulse width is larger than the original pulse width. When the difference between the original pulse width and the pulse width threshold value is smaller than the predetermined value, and the original pulse width is smaller than the pulse width threshold value, the output pulse width of the output signal is set to be a shortened pulse width by the lock confirmation circuit, wherein the difference between the shortened pulse width and the pulse width threshold value is not smaller than the predetermined value and the shortened pulse width is smaller than the original pulse width; determining that the image data reception apparatus already locks a transmission frequency according to the training pattern signal by each of the image data transmission circuits when the output pulse width of the output signal is larger than the pulse width threshold value, and performing a synchronous image data transmission with the image data reception apparatus according to a timing of the training pattern signal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an image display system and an image data transmission apparatus and method thereof having synchronous data transmission mechanism to perform accurate determination, by the image data transmission circuits of the image data transmission apparatus, on the signal transmitted from the image data reception apparatus. The synchronous image data transmission with the image data reception apparatus can be established.

Figure 1:
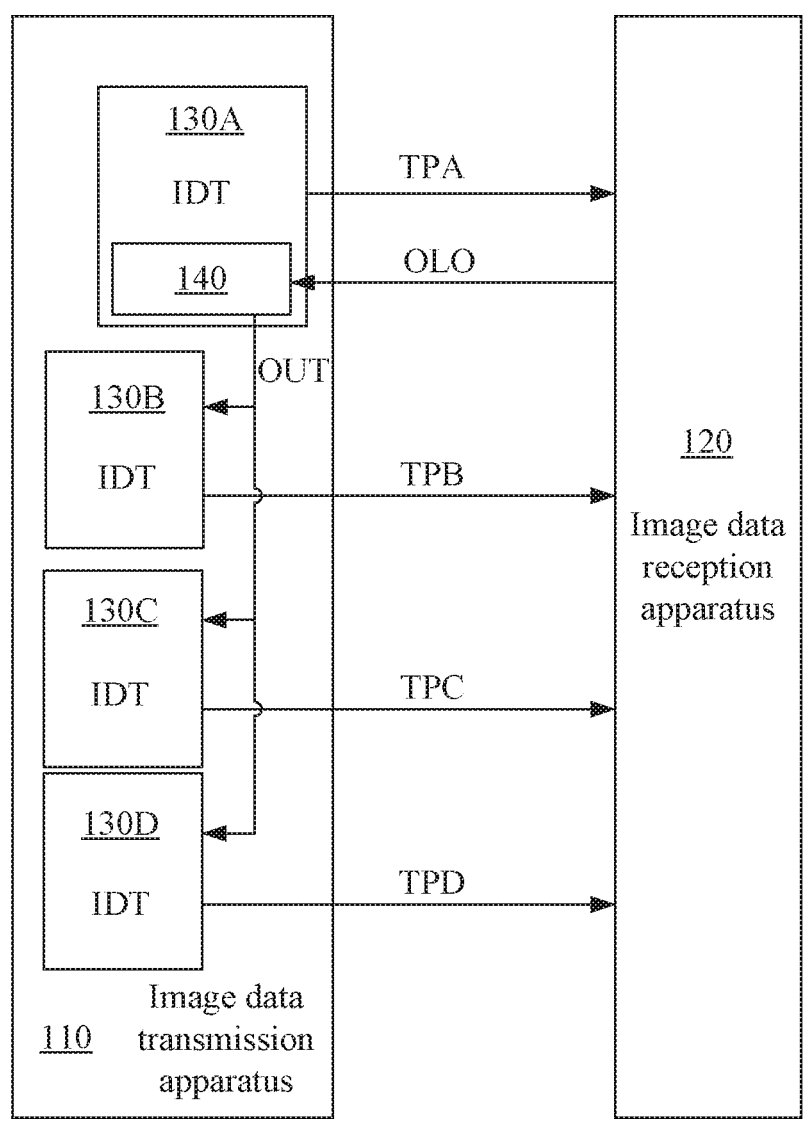
FIG. 1 illustrates a diagram of an image display system according to an embodiment of the present invention.

Reference is now made to FIG. 1. FIG. 1 illustrates a diagram of an image display system 100 according to an embodiment of the present invention. The image display system 100 includes an image data transmission apparatus 110 and an image data reception apparatus 120.

In an embodiment, the image display system 100 is such as, but not limited to a television. The image data transmission apparatus 110 is a circuit configured to provide image data. The image data reception apparatus 120 is a panel configured to receive and playback the image data.

Under the trend that the size of the panel becomes larger and larger, the image data transmission apparatus 110 transmits a multiple pieces of image data (not illustrated) by using different internal circuits to the image data reception apparatus 120 to be displayed thereby. Different pieces of image data correspond to different display areas of the panel. As a result, a synchronous data transmission mechanism is required for the image data transmission apparatus 110 to perform image data transmission, such that the image data reception apparatus 120 receives and displays the multiple pieces of image data signals according to the correct timing to generate a correct image.

The image data transmission apparatus 110 includes a plurality of image data transmission circuits 130A~130D (abbreviated as IDT in FIG. 1) and a lock confirmation circuit 140.

Each of the image data transmission circuits 130A~130D is configured to transmit a training pattern signals TPA~TPD to the image data reception apparatus 120. In an embodiment, the image data transmission circuits 130A~130D performs image data transmission according to a high frequency clock signal that results in higher data signal transition frequency. In this case, the content of the training pattern signals TPA~TPD includes such as, but not limited to a long sequence of 0s and 1s. Under the condition of less frequent data signal transition, such configuration allows the image data reception apparatus 120 to easily lock a transmission frequency according to the training pattern signals TPA~TPD.

After locking the frequency according to the training pattern signals TPA~TPD, the image data reception apparatus 120 transmits a signal back to the image data transmission circuits 130A~130D, such that the image data transmission circuits 130A~130D acknowledges a successful locking of the transmission frequency. Subsequently, the image data transmission circuits 130A~130D can perform synchronous image data transmission with the image data reception apparatus 120 according to the timing of the training pattern signals TPA~TPD.

In an embodiment, the signal that the image data reception apparatus 120 transmits back is a signal having a specific pulse width. However, the channel between the image data reception apparatus 120 and the lock confirmation circuit 140 may generate impulses due to the presence of noise. As a result, it requires an identification mechanism for the image data transmission apparatus 110 to determine whether the signal from the image data reception apparatus 120 is a frequency lock confirmation signal or a noise.

In an embodiment, the lock confirmation circuit 140 is disposed in the image data transmission circuits 130A and is configured to receive an original signal OLO having an original pulse width from the image data reception apparatus 120 in order to generate an output signal OUT.

More specifically, the lock confirmation circuit 140 is configured to determine a difference between the original pulse width of the original signal OLO and a pulse width threshold value, and to compare the original pulse width with the pulse width threshold value. The lock confirmation circuit 140 generates the output signal OUT according to the determination result and the comparison result.

Figure 2A:
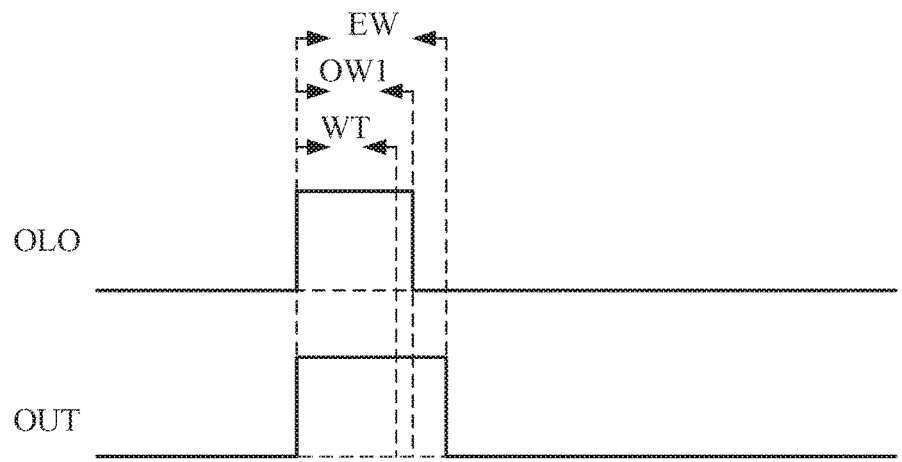
FIG. 2A illustrates a waveform diagram of the original signal and the output signal according to an embodiment of the present invention.

Reference is now made to FIG. 2A. FIG. 2A illustrates a waveform diagram of the original signal OLO and the output signal OUT according to an embodiment of the present invention.

In the embodiment of FIG. 2A, the original signal OLO has the original pulse width OW1. The lock confirmation circuit 140 is configured to determine the difference between the original pulse width OW1 and the pulse width threshold value WT, and compare the amounts of the original pulse width OW1 and the pulse width threshold value.

When the lock confirmation circuit 140 determines that the difference between the original pulse width OW1 and the pulse width threshold value WT is smaller than the predetermined value, and the original pulse width OW1 is not smaller than the pulse width threshold value WT, the lock confirmation circuit 140 sets the output pulse width of the output signal OUT to be a lengthened pulse width EW. The difference between the lengthened pulse width EW and the pulse width threshold value WT is not smaller than the predetermined value, and the lengthened pulse width EW is larger than the original pulse width OW1.

Figure 2B:
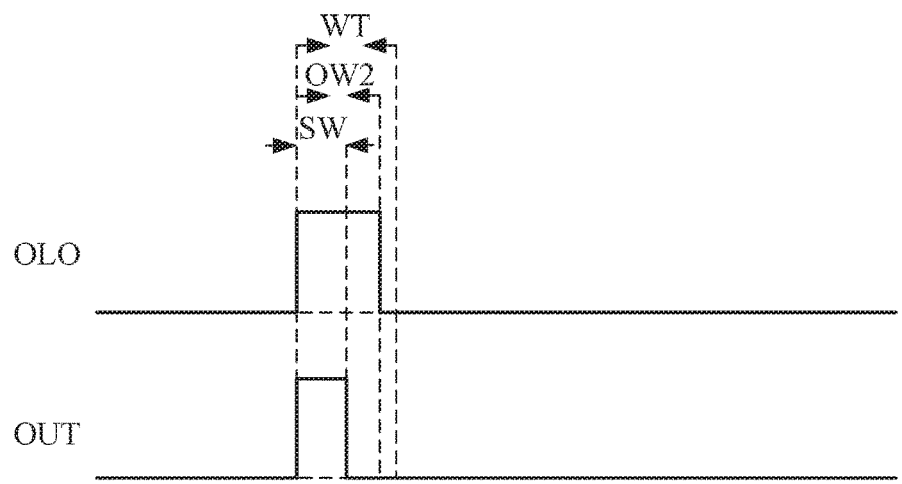
FIG. 2B illustrates a waveform diagram of the original signal and the output signal according to another embodiment of the present invention.

Reference is now made to FIG. 2B. FIG. 2B illustrates a waveform diagram of the original signal OLO and the output signal OUT according to another embodiment of the present invention.

In the embodiment of FIG. 2B, the original signal OLO has the original pulse width OW2. The lock confirmation circuit 140 is configured to determine the difference between the original pulse width OW2 and the pulse width threshold value WT, and compare amount of the original pulse width OW2 and the pulse width threshold value.

When the lock confirmation circuit 140 determines that the difference between the original pulse width OW2 and the pulse width threshold value WT is smaller than the predetermined value, and the original pulse width OW2 is smaller than the pulse width threshold value WT, the lock confirmation circuit 140 sets the output pulse width of the output signal OUT to be a shortened pulse width SW. The difference between the shortened pulse width SW and the pulse width threshold value WT is not smaller than the predetermined value, and the shortened pulse width SW is smaller than the original pulse width OW2.

It is appreciated that, in an embodiment, the lock confirmation circuit 140 can selectively set the shortened pulse width SW to be 0. Under such a condition, the output signal OUT is actually a low status signal.

Figure 2C:
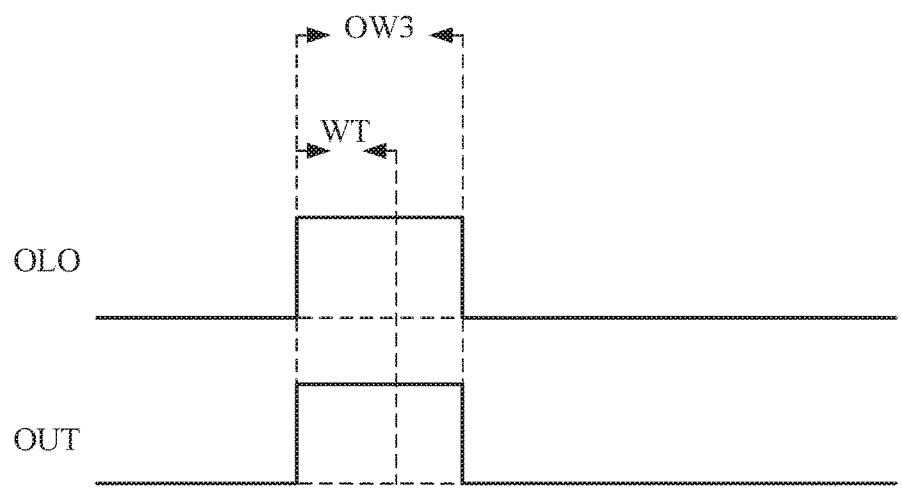
FIG. 2C illustrates a waveform diagram of the original signal and the output signal according to yet another embodiment of the present invention.

Reference is now made to FIG. 2C. FIG. 2C illustrates a waveform diagram of the original signal OLO and the output signal OUT according to yet another embodiment of the present invention.

In the embodiment of FIG. 2C, the original signal OLO has the original pulse width OW3. The lock confirmation circuit 140 is configured to determine the difference between the original pulse width OW3 and the pulse width threshold value WT, and compare the original pulse width OW3 and the pulse width threshold value.

When the lock confirmation circuit 140 determines that the difference between the original pulse width OW3 and the pulse width threshold value WT is not smaller than the predetermined value, the lock confirmation circuit 140 directly sets the output pulse width of the output signal OUT to be the original pulse width OW3, no matter which of the original pulse width OW3 and the pulse width threshold value is larger.

It is appreciated that, in the practical implementation, since the output signal OUT is generated by processing the original signal OLO by the lock confirmation circuit 140, the timing of the output signal OUT will fall behind the original signal OLO. More specifically, the rising edge of the output signal OUT will fall behind the rising edge of the original signal OLO. However, in order to easily compare the difference of the pulse widths, the rising edges of the original signal OLO and the output signal OUT are illustrated to be aligned instead of being illustrated according to the actual timings in FIG. 2A~FIG. 2C.

Each of the image data transmission circuits 130A~130D is configured to receive the output signal OUT generated by the lock confirmation circuit 140, and determines whether the communication is performed with the image data reception apparatus 120 according to the output signal OUT. Since the lock confirmation circuit 140 is disposed in the image data transmission circuits 130A, cables are required to connect the lock confirmation circuit 140 and the image data transmission circuits 130B~130D for transmitting the output signal OUT.

In an embodiment, each of the image data transmission circuits 130A~130D is configured to determine whether the output pulse width of the output signal OUT is larger than the pulse width threshold value WT.

When the lock confirmation circuit 140 generates the output signal OUT having the output pulse width that is the lengthened pulse width EW, as illustrated in FIG. 2A, each of the image data transmission circuits 130A~130D determines that the lengthened pulse width EW is larger than the pulse width threshold value WT. Each of the image data transmission circuits 130A~130D further determines that the image data reception apparatus 120 has already locked the transmission frequency according to the training pattern signals TPA~TPD. The image data transmission circuits 130A~130D further perform synchronous image data transmission with the image data reception apparatus 120 according to the timing of the training pattern signals TPA~TPD.

When the lock confirmation circuit 140 generates the output signal OUT having the output pulse width that is the shortened pulse width SW, as illustrated in FIG. 2B, each of the image data transmission circuits 130A~130D determines that the shortened pulse width SW is smaller than the pulse width threshold value WT. Each of the image data transmission circuits 130A~130D further identifies the shortened pulse width SW as a noise, and determines that the image data reception apparatus 120 has not yet lock the transmission frequency.

When the lock confirmation circuit 140 generates the output signal OUT having the output pulse width that is the output pulse width OW3, as illustrated in FIG. 2C, each of the image data transmission circuits 130A~130D determines the amounts of the original pulse width OW3. When the original pulse width OW3 is larger than the pulse width threshold value WT, the image data transmission circuits 130A~130D perform synchronous image data transmission with the image data reception apparatus 120 according to the timing of the training pattern signals TPA~TPD. When the original pulse width OW3 is smaller than the pulse width threshold value WT, the image data transmission circuits 130A~130D identify the shortened pulse width SW as a noise, and determine that the image data reception apparatus 120 has not lock the transmission frequency.

In an embodiment, the pulse width threshold value described above is such as, but not limited to 1 millisecond (ms). As a result, in general, the image data transmission circuits determine that the image data reception apparatus has already locked the transmission frequency when the pulse width of the signal transmitted from the image data reception apparatus is larger than 1 ms. The image data transmission circuits identify the pulse width as a noise, and determine that the image data reception apparatus does not lock the transmission frequency when the pulse width of the signal transmitted from the image data reception apparatus is than 1 ms.

In an embodiment, the pulse width of the output signal OUT generated by the lock confirmation circuit 140 can be far larger than the pulse width threshold value WT, instead of being slightly larger than the pulse width threshold value WT illustrated in FIG. 2A or FIG. 2C. However, once the image data transmission circuits 130A~130D determine that the pulse width of the output signal OUT generated by the lock confirmation circuit 140 (e.g. the lengthened pulse width EW in FIG. 2A and the original pulse width OW3 in FIG. 2C) is larger than the pulse width threshold value WT, the image data transmission circuits 130A~130D can determine that the image data reception apparatus 120 already locks the transmission frequency according to the training pattern signals TPA~TPD.

In some approaches, when the pulse width of the signal transmitted from the image data reception apparatus closely approximated to the pulse width threshold value (e.g. 1 ms), different image data transmission circuits may generate various determination results. A part of the image data transmission circuits may determine that the image data reception apparatus already locks the transmission frequency, while the other part of the image data transmission circuits determine that the image data reception apparatus does not lock the transmission frequency. Such a condition does not allow the image data transmission circuits to establish correct data transmission with the image data reception apparatus.

The image data transmission apparatus having the synchronous data transmission mechanism can perform determination on the pulse width of the original signal transmitted from the image data reception apparatus by disposing the lock confirmation circuit. Some specific pulse widths that may result in different determination results can be adjusted to prevent the influence of noises, such that the image data transmission circuits can reach identical determination results. Then, the image data transmission apparatus can establish synchronous data transmission with the image data reception apparatus accurately.

It is appreciated that the embodiments described above uses the condition that the lock confirmation circuit 140 is disposed in the image data transmission circuits 130A as an example. In other embodiments, the lock confirmation circuit 140 can be disposed in one of the other image data transmission circuits 130B~130D, or can be disposed independently outside of the image data transmission circuits 130A~130D.

It is appreciated that in the above embodiments, the number of the image data transmission circuits 130A~130D is merely an example. In other embodiments, the number of the image data transmission circuits 130A~130D can be different depending on the design requirement of the image data reception apparatus 120.

It is appreciated that in the embodiments in FIG. 2A~FIG. 2C, each of the pulse widths of the original signal OLO received by the lock confirmation circuit 140 and the output signal OUT generated by the lock confirmation circuit 140 is defined based on a positive pulse. More specifically, the pulse width is defined by duration of a signal from a rising edge to a falling edge. In other embodiments, each of the pulse widths of the original signal OLO received by the lock confirmation circuit 140 and the output signal OUT generated by the lock confirmation circuit 140 can be defined based on a negative pulse. More specifically, the pulse width is defined by duration of a signal from a falling edge to a rising edge.

Figure 3:
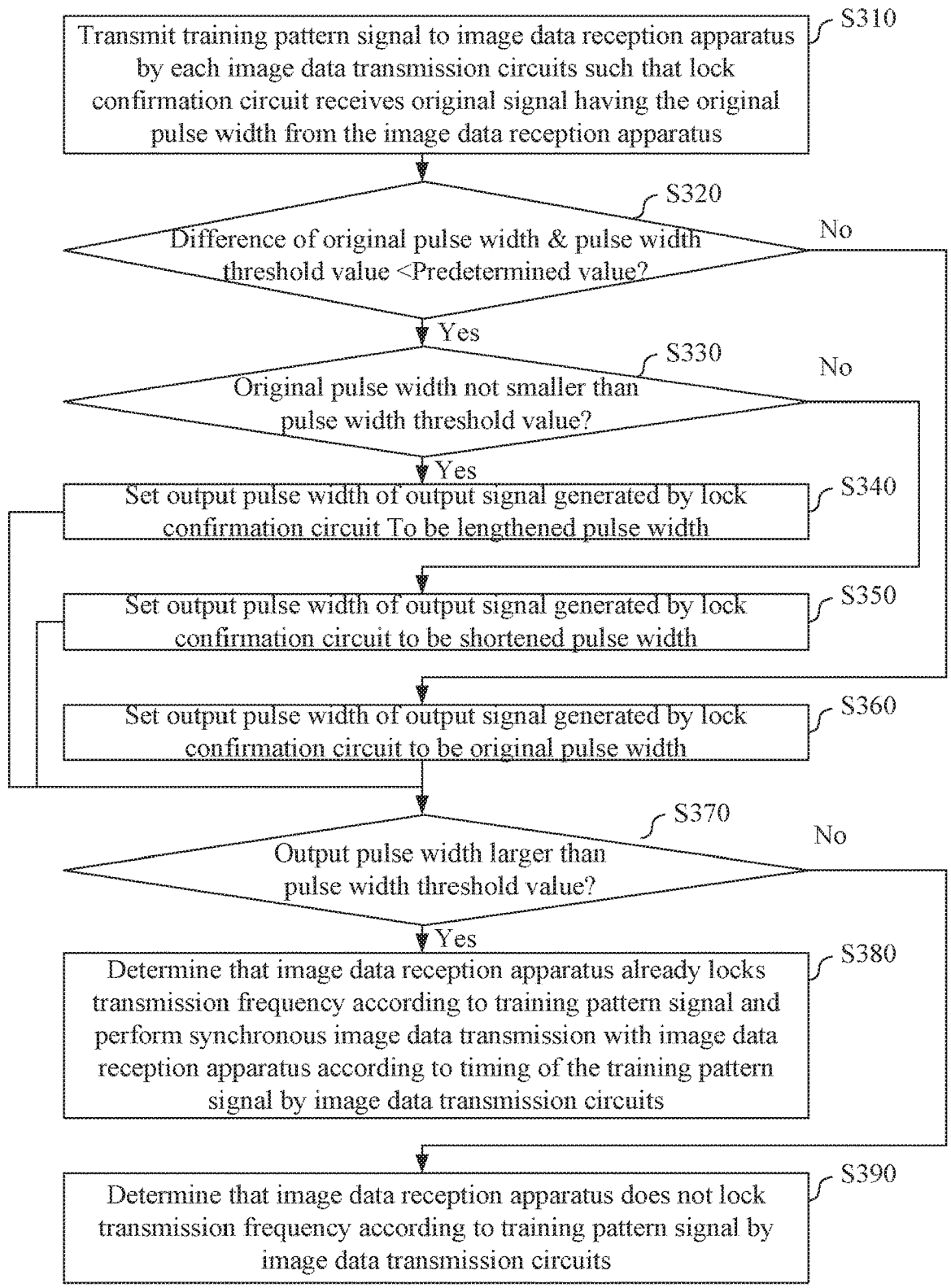
FIG. 3 illustrates a flow chart of an image data transmission method having synchronous data transmission mechanism according to an embodiment of the present invention.

Reference is now made to FIG. 3. FIG. 3 illustrates a flow chart of an image data transmission method 300 having synchronous data transmission mechanism according to an embodiment of the present invention.

Besides the apparatus described above, the present invention further discloses the image data transmission method 300 that can be used in such as, but not limited to the image data transmission apparatus 110 included in the image display system 100 illustrated in FIG. 1. An embodiment of the image data transmission method 300 is illustrated in FIG. 3 and includes the steps outlined below.

In step S310, the training pattern signal, e.g. the training pattern signals TPA~TPD, is transmitted to the image data reception apparatus 120 by each of the image data transmission circuits 130A~130D such that the lock confirmation circuit 140 receives the original signal OLO having the original pulse width from the image data reception apparatus 120.

In step S320, whether the difference between the original pulse width and the pulse width threshold value is smaller than the predetermined value is determined by the lock confirmation circuit 140.

In step S330, when the difference between the original pulse width and the pulse width threshold value is smaller than the predetermined value, the lock confirmation circuit 130 further determines whether the original pulse width is not smaller than the pulse width threshold value.

In step S340, when the original pulse width is not smaller than the pulse width threshold value, the output pulse width of the output signal OUT generated by the lock confirmation circuit 140 is set to be the lengthened pulse width. The difference between the lengthened pulse width and the pulse width threshold value is not smaller than the predetermined value, and the lengthened pulse width is larger than the original pulse width.

In step S350, when the original pulse width is smaller than the pulse width threshold value, the output pulse width of the output signal OUT generated by the lock confirmation circuit 140 is set to be the shortened pulse width. The difference between the shortened pulse width and the pulse width threshold value is not smaller than the predetermined value, and the shortened pulse width is smaller than the original pulse width.

In step S360, when the lock confirmation circuit 140 determines that the difference between the original pulse width and the pulse width threshold value is not smaller than the predetermined value in step S320, the output pulse width of the output signal OUT generated by the lock confirmation circuit 140 is set to be the original pulse width.

In step S370, after the lock confirmation circuit 140 generates the output signal OUT in steps S340, S350 or S360, the image data transmission circuits 130A~130D determine whether the output pulse width of the output signal OUT is larger than the pulse width threshold value.

In step S380, when the image data transmission circuits 130A~130D determine that the output pulse width of the output signal OUT is larger than the pulse width threshold value, the image data transmission circuits 130A~130D determine that the image data reception apparatus 120 already locks the transmission frequency according to the training pattern signal TPA~TPD and perform the synchronous image data transmission with the image data reception apparatus 120 according to the timing of the training pattern signal TPA~TPD.

In step S390, when the image data transmission circuits 130A~130D determine that the output pulse width of the output signal OUT is smaller than the pulse width threshold value, the image data transmission circuits 130A~130D determine that the image data reception apparatus 120 does not lock the transmission frequency according to the training pattern signal TPA~TPD.

It is appreciated that the embodiments described above are merely an example. In other embodiments, it should be appreciated that many modifications and changes may be made by those of ordinary skill in the art without departing, from the spirit of the invention.

In summary, the image display system and the image data transmission apparatus and method thereof having synchronous data transmission mechanism of the present invention can perform determination on the pulse width of the original signal transmitted from the image data reception apparatus accurately to establish synchronous data transmission with the image data reception apparatus.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An image data transmission apparatus having synchronous data transmission mechanism, comprising:
   a plurality of image data transmission circuits, each configured to transmit a training pattern signal to an image data reception apparatus; and
   a lock confirmation circuit configured to receive an original signal having an original pulse width from the image data reception apparatus, to generate an output signal, such that each of the image data transmission circuits is further configured to determine that the image data reception apparatus already locks a transmission frequency according to the training pattern signal when an output pulse width of the output signal is larger than a pulse width threshold value, and to perform a synchronous image data transmission with the image data reception apparatus according to a timing of the training pattern signal;
   wherein when a difference between the original pulse width and the pulse width threshold value is smaller than a predetermined value, and the original pulse width is not smaller than the pulse width threshold value, the lock confirmation circuit sets the output pulse width of the output signal to be a lengthened pulse width, wherein the difference between the lengthened pulse width and the pulse width threshold value is not smaller than the predetermined value and the lengthened pulse width is larger than the original pulse width;
   when the difference between the original pulse width and the pulse width threshold value is smaller than the predetermined value, and the original pulse width is smaller than the pulse width threshold value, the lock confirmation circuit sets the output pulse width of the output signal to be a shortened pulse width, wherein the difference between the shortened pulse width and the pulse width threshold value is not smaller than the predetermined value and the shortened pulse width is smaller than the original pulse width.

2. The image data transmission apparatus of claim 1, wherein each of the image data transmission circuits is configured to determine that the image data reception apparatus does not lock the transmission frequency according to the training pattern signal when the output pulse width is smaller than the pulse width threshold value.

3. The image data transmission apparatus of claim 1, wherein when the difference between the original pulse width and the pulse width threshold value is not smaller than the predetermined value, the lock confirmation circuit sets the output pulse width of the output signal as the original pulse width.

4. The image data transmission apparatus of claim 1, wherein the lock confirmation circuit is disposed independently outside of the image data transmission circuits.

5. The image data transmission apparatus of claim 1, wherein the lock confirmation circuit is disposed in one of the image data transmission circuits.

6. The image data transmission apparatus of claim 1, wherein the image data reception apparatus is a display panel of an image display system, the image data transmission circuits are configured to transmit a plurality pieces of image data each corresponding to one of a plurality of display areas of the display panel.

7. An image display system, comprising:
   an image data reception apparatus; and
   an image data transmission apparatus, comprising:
      a plurality of image data transmission circuits, each configured to transmit a training pattern signal to the image data reception apparatus; and
      a lock confirmation circuit configured to receive an original signal having an original pulse width from the image data reception apparatus, to generate an output signal according to a relation between the original pulse width and a pulse width threshold value, such that each of the image data transmission circuits is further configured to determine that the image data reception apparatus already locks a transmission frequency according to the training pattern signal when an output pulse width of the output signal is larger than the pulse width threshold value, and to perform a synchronous image data transmission with the image data reception apparatus according to a timing of the training pattern signal;
   wherein when a difference between the original pulse width and the pulse width threshold value is smaller than a predetermined value, and the original pulse width is not smaller than the pulse width threshold value, the lock confirmation circuit sets the output pulse width of the output signal to be a lengthened pulse width, wherein the difference between the lengthened pulse width and the pulse width threshold value is not smaller than the predetermined value and the lengthened pulse width is larger than the original pulse width;
   when the difference between the original pulse width and the pulse width threshold value is smaller than the predetermined value, and the original pulse width is smaller than the pulse width threshold value, the lock confirmation circuit sets the output pulse width of the output signal to be a shortened pulse width, wherein the difference between the shortened pulse width and the pulse width threshold value is not smaller than the predetermined value and the shortened pulse width is smaller than the original pulse width.

8. The image display system of claim 7, wherein each of the image data transmission circuits is configured to determine that the image data reception apparatus does not lock the transmission frequency according to the training pattern signal when the output pulse width is smaller than the pulse width threshold value.

9. The image display system of claim 7, wherein when the difference between the original pulse width and the pulse width threshold value is not smaller than the predetermined value, the lock confirmation circuit sets the output pulse width of the output signal as the original pulse width.

10. The image display system of claim 7, wherein the lock confirmation circuit is disposed independently outside of the image data transmission circuits.

11. The image display system of claim 7, wherein the lock confirmation circuit is disposed in one of the image data transmission circuits.

12. The image display system of claim 7, wherein the image data reception apparatus is a display panel of the image display system, the image data transmission circuits are configured to transmit a plurality pieces of image data each corresponding to one of a plurality of display areas of the display panel.

13. An image data transmission method having synchronous data transmission mechanism used in an image data transmission apparatus, comprising:
- transmitting a training pattern signal to an image data reception apparatus by each of a plurality of image data transmission circuits;
- receiving an original signal having an original pulse width from the image data reception apparatus by a lock confirmation circuit;
- determining whether a difference between the original pulse width and a pulse width threshold value is smaller than a predetermined value by the lock confirmation circuit, to generate an output signal having an output pulse width accordingly;
- when the difference between the original pulse width and the pulse width threshold value is smaller than a predetermined value, and the original pulse width is not smaller than the pulse width threshold value, setting the output pulse width of the output signal to be a lengthened pulse width by the lock confirmation circuit, wherein the difference between the lengthened pulse width and the pulse width threshold value is not smaller than the predetermined value and the lengthened pulse width is larger than the original pulse width;
- when the difference between the original pulse width and the pulse width threshold value is smaller than the predetermined value, and the original pulse width is smaller than the pulse width threshold value, setting the output pulse width of the output signal to be a shortened pulse width by the lock confirmation circuit, wherein the difference between the shortened pulse width and the pulse width threshold value is not smaller than the predetermined value and the shortened pulse width is smaller than the original pulse width;
- determining that the image data reception apparatus already locks a transmission frequency according to the training pattern signal by each of the image data transmission circuits when the output pulse width of the output signal is larger than the pulse width threshold value, and performing a synchronous image data transmission with the image data reception apparatus according to a timing of the training pattern signal.

14. The image data transmission method of claim 13, further comprising:
- determining that the image data reception apparatus does not lock the transmission frequency according to the training pattern signal by each of the image data transmission circuits when the output pulse width is smaller than the pulse width threshold value.

15. The image data transmission method of claim 13, further comprising:
- when the difference between the original pulse width and the pulse width threshold value is not smaller than the predetermined value, setting the output pulse width of the output signal as the original pulse width by the lock confirmation circuit.

16. The image data transmission method of claim 13, wherein the lock confirmation circuit is disposed independently outside of the image data transmission circuits.

17. The image data transmission method of claim 13, wherein the lock confirmation circuit is disposed in one of the image data transmission circuits.

18. The image data transmission method of claim 13, wherein the image data reception apparatus is a display panel of an image display system, the image data transmission circuits are configured to transmit a plurality pieces of image data each corresponding to one of a plurality of display areas of the display panel.

\* \* \* \* \*